April 21, 1953  C. R. WORTHINGTON  2,635,669
COMBINED CLAMPING FIXTURE AND GAUGE
Filed April 10, 1951  2 SHEETS—SHEET 1

CARL R. WORTHINGTON
INVENTOR

HUEBNER, BEEHLER,
WORREL & HERZIG
ATTORNEYS

BY Richard M. Worrel

April 21, 1953   C. R. WORTHINGTON   2,635,669
COMBINED CLAMPING FIXTURE AND GAUGE
Filed April 10, 1951   2 SHEETS—SHEET 2

CARL R. WORTHINGTON
INVENTOR
HUEBNER, BEEHLER,
WORREL & HERZIG
ATTORNEYS

Patented Apr. 21, 1953

2,635,669

UNITED STATES PATENT OFFICE 2,635,669

COMBINED CLAMPING FIXTURE AND GAUGE

Carl R. Worthington, Tulare, Calif., assignor of one-half to Linder Truck & Tractor Co. Inc., Tulare, Calif.

Application April 10, 1951, Serial No. 220,211

7 Claims. (Cl. 153—78)

The present invention relates to holding jigs or fixtures and more particularly to the combination of such a device for rigidly holding cotton picker spindle bars, or the like, and a corrective and checking gauge for rectifying deformed portions of such workpieces to desired form and arrangement.

Mechanical cotton pickers are conventionally constructed with a picker head including a spindle bar from which radially extend a plurality of rotatable barbed spindles and which is rotated by an integral picker bar cam arm. These spindle bars and spindles are operable under precision requirements and often encounter foreign objects during the picking of cotton which bend or spring them and their cam arms into distorted conditions. The corrections of the spindle bars and cam arms is of such difficulty that it has been the usual practice to discard them in the event of any appreciable maladjustment and substitute entirely new replacements. This is obviously an expensive procedure and constitutes a major expense in cotton picker repair.

An object of the present invention is to provide an improved fixture providing adjustable, precision clamping of malformed work pieces conducive to accurate reshaping operations.

Another object is to provide improved means for correcting misshapen cotton picker spindle bars and their cam arms or the like.

Another object is to provide an improved fixture for holding members, such as cotton picker spindle bars, for bending and straightening portions thereof to desired form and arrangement.

Another object is to provide a fixture for clamping spindle bars and the like in adjustable positions and attitudes for convenience in imposing reshaping forces thereon.

A still further object is to provide a combined fixture of the type described and auxiliary blocks of various forms as further aids in the imposition of corrective stresses on malformed work pieces.

A still further object is to provide a fixture adapted accurately to conform misshapen work pieces to predetermined configuration and arrangement and precisely to gauge deviation from such predetermined standard.

Another object is to provide an economically produced, conveniently and speedily operable, and dependably serviceable fixture of the character described.

Other objects and advantages will become apparent in the subsequent description in the specification.

Referring to the drawings.

Figure 1:
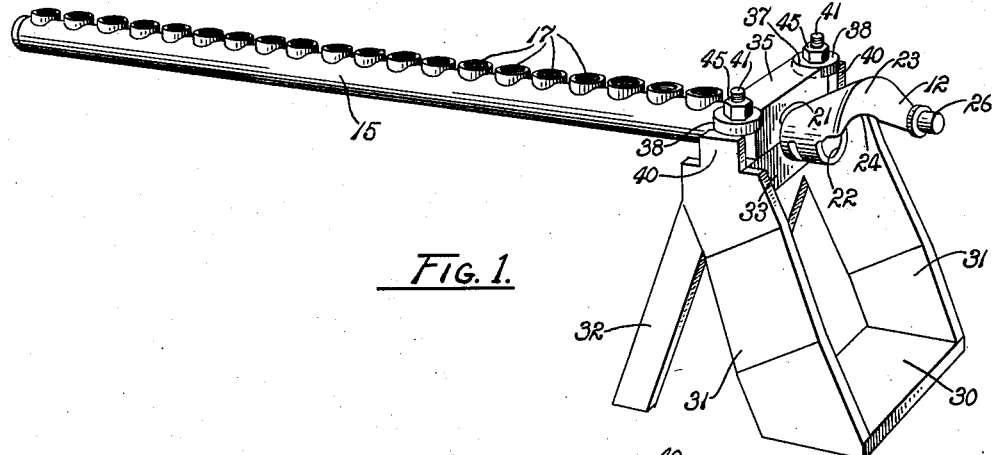
Fig. 1 is a perspective view of a fixture embodying the principles of the present invention having a spindle bar of a mechanical cotton picker clamped therein, as for corrective shaping thereof.

Referring in greater detail to the drawings:

The fixture of the present invention is indicated generally by the reference numeral 10 and is adapted particularly to hold a mechanical cotton picker spindle bar, indicated by the reference numeral 11, for the purpose of imposing reshaping forces thereon. The spindle bar illustrated in the drawing is of well-known form and has a cam arm 12 laterally extended therefrom and of somewhat arcuate form. A plurality of such picker bars are rotatably mounted in a picker head, not shown, of conventional mechanical cotton pickers with a plurality of picker spindles extending radially from each spindle bar. The rotating spindles in the picker head encounter cotton plants during the picking operation and remove bolls of cotton from the plants. The spindles occasionally engage foreign objects which retard the rotation of the spindle bars and distort the spindle bars and/or their crank arms. By disassembling the picker bars from the cotton picker each picker bar may be clamped into the fixture for straightening purposes and salvaged for further use. Although the utility of the fixture of the present invention is illustrated by reference to the described spindle bars, it will be apparent that the fixture may advantageously be employed on many other forms of work pieces.

Figure 5:
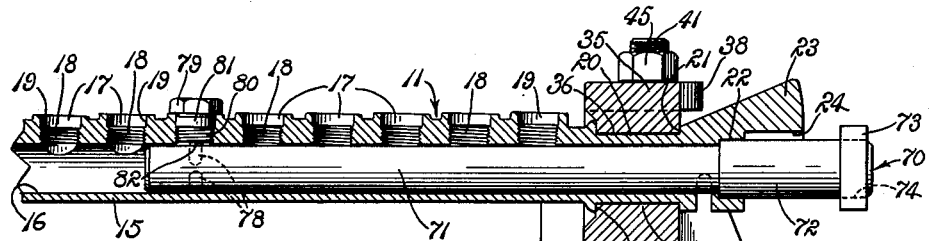
Fig. 5 is a fragmentary longitudinal section through the fixture and spindle bar with a testing gauge telescoped internally of the spindle bar and a plug threaded into a spindle bar opening holding the testing gauge in place.
Figure 6:
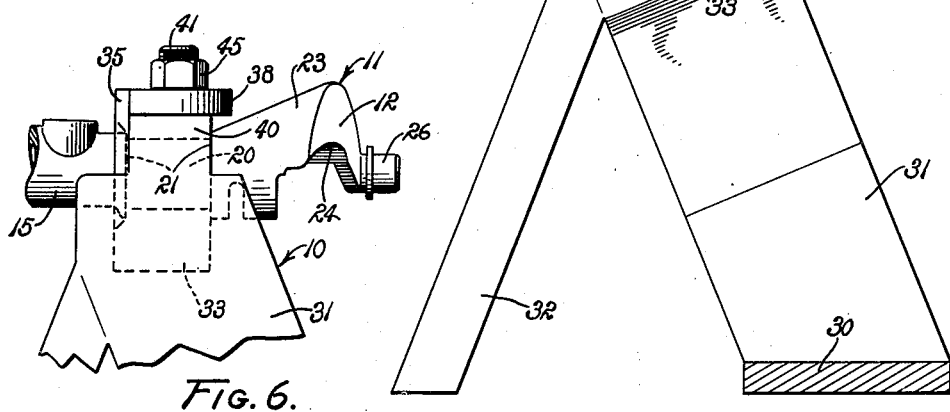
Fig. 6 is a fragmentary side elevation of the clamping portion of the fixture and adjacent portions of the spindle bar.

The spindle bar includes an elongated substantially cylindrical body 15 with a cylindrical bore 16 longitudinally thereof. A plurality of spindle mounting openings 17 are conventionally formed through the body into the bore 16 in alignment longitudinally of the body 15 as shown in Fig. 5. Each of the openings is internally threaded at 18 adjacent to the bore 16 and provided with a precision cylindrical surface 19 outwardly thereof. The spindle bar is formed with an externally cylindrical journal portion 20 on which it is rotatably mounted in a mechanical cotton picker with radially outwardly extending shoulders 21 at each end of the journal portion 20 defining the length of the journal portion. The spindle bar is counterbored at 22 inwardly of the journal end portion of the spindle bar. This counterbored end of the spindle bar is provided with an endward extension 23 which is formed with a partial counterbore 24 concentrically of the counterbore 22 and bore 16 of the spindle bar. The endward extension 23 projects radially and slightly endwardly of the body of the spindle bar in the form of the cam arm 12 which terminates in a cam follower journal 26 of cylindrical form axially parallel to the bore 16 of the spindle bar. Whenever a spindle bar becomes deformed, the deformity usually consists of either distortion of the endward extension 23 by inward bending toward the axis of the spindle bar, bending of the counterbored portion of the spindle bar in the direction of the endward extension, bending of the cam arm 12 to locate the cam follower journal 26 at greater than its intended distance from the axis of the spindle bar axis, or torsional deformation of the bar.

The fixture 10, which is adapted rigidly to hold the spindle bar for bending purposes, is provided with a substantially rectangular base plate 30 which is adapted to rest on a supporting surface, with a pair of elongated substantially rectangular support plates 31 welded to parallel edges of the base plate and extended upwardly and convergently therefrom. A supporting leg 32 is attached, as by welding, near the upper portion of each of the supporting plates and extends angularly downwardly in diverging relation to the supporting plates terminating at a plane of the lower face of the base plate to stabilize the supporting plates 31 on a supporting surface. An elongated rectangular support block 33 is weldably secured at its ends to inner faces of the support plates 31 near their upper ends and extends transversely therebetween in parallel relation to the base plate. A semi-cylindrical recess 34 is formed axially transversely of the length of the support block 33 downwardly in its upper surface. An elongated rectangular clamping block 35 is provided with a semi-cylindrical recess 36, complementary to the semi-cylindrical recess 34 of the support block 33, axially transversely of its length and upwardly of a flat bottom surface thereof. Segmentally cylindrical notches 37 are machined into the upper surface of opposite ends of the clamping block 35 to receive peripheral portions of substantially cylindrical clamping washers 38 hereinafter more fully described.

Figures 7, 8:
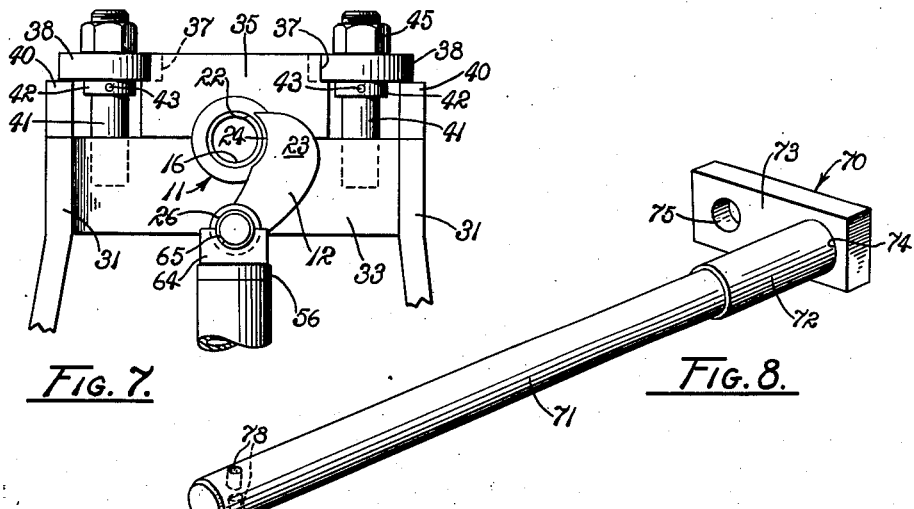
Fig. 7 is a fragmentary end elevation of the clamping portion of the fixture with a crank arm of the spindle bar in a position to have the crank arm thereof bent by a jack, also fragmentarily represented.
Fig. 8 is a perspective view of the testing gauge illustrated in use in Fig. 5.

Each of the support plates 31 extends upwardly above the support block 33 in a narrowed vertical projection 40 and terminates at the level of the bottoms of the semi-cylindrical notches 37 of the clamping block 35, as evident in Fig. 7. A stud 41 is mounted in an erect position in the support block 33 inwardly adjacent to each of the projections 40 concentric to the semi-cylindrical recesses when the clamping block is in operable position. A collar 42 circumscribes each of the studs 41 and is pinned to its respective stud at 43 with its upper surface slightly below the upper terminal surface of its adjacent projection 40. A pair of the clamp washers 38 are provided each having an elongated opening 44 diametrically therein having a semi-circular end portion concentric to the washer and a semi-circular opposite end portion adjacent to the periphery of the washer. One of the washers is located in circumscribing relation to each of the studs 39 with the studs extending upwardly therefrom. With the journal portion 20 of the spindle bar rested in the semi-cylindrical recess 34 in the support block, the semi-cylindrical recess 36 of the clamping block 35 is located downwardly over the upper periphery of the journal portion of the spindle bar. The washers are placed over the upper ends of the studs in circumscribing relation thereto with one portion of each washer resting on the upper end of a projection 40 and a diametrically opposite portion of the washer rested in a semi-cylindrical notch 37 of the clamping block 35. The clamping block is forced downwardly to clamp the spindle bar non-rotatably between the supporting block 33 and the clamping block 35 by threadably engaging a nut 45 onto the upper end of each of the studs 41 and forcing each nut downwardly against its respective washers 38.

The employment of the clamping washers 38 of the form described in the semi-cylindrical recesses in the opposite ends of the clamping block possesses a significance worthy of note. The washers are rotatable concentrically about the studs nested in the semi-cylindrical recesses. For dependable clamping action the washers are rotated to the positions shown in Fig. 2 with the inner ends of the elongated openings 44 concentric to the studs and the nuts 45 tightened. So arranged, no accidental displacement of the clamping black 35 from precise position is possible. To release the clamping block expeditiously, the nuts 45 are loosened, the washers rotated 180° from the positions shown in Fig. 2, and the washers slid outwardly on the studs across the upwardly extended end portions of the support plates 31 freeing the clamping block 35. It will be observed that the nuts 45 always retain the washers on the studs 41. When the washers are slid outwardly, as described, they also accommodate passage of the block downwardly therebetween. With the clamping block in position, the washers are rotatably returned to the positions shown in Fig. 2, nested in the recesses 37, and dependably retain the block and spindle bar in the fixture. The spindle bar is rotated to the position desired and brief tightening of the nuts serves to secure the spindle bar in the precise position desired. The collars 42 maintain the washers in a substantially horizontal position for convenience in receipt and removal of the clamping block when the nuts 45 are loosened and the washers rotated as described.

Figure 3:
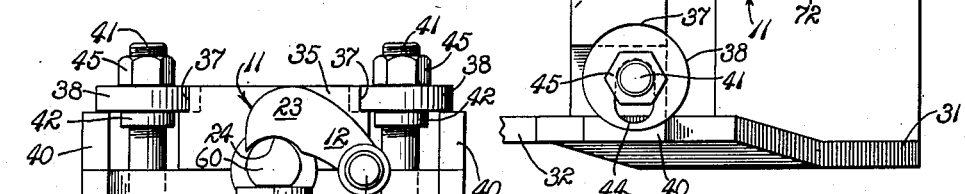
Fig. 3 is an end elevational view of the fixture and spindle bar with a hydraulic jack positioned to apply corrective forces thereto.

With the spindle bar clamped into the fixture 10, the spindle bar may be bent by means of a jack 50, as illustrated in Fig. 3 of the drawing. In the present instance the jack is in the form of a hydraulically operable jack and has a movable head 56 which is driven upwardly with great pressure on operation of the hydraulic jack.

Figure 4:
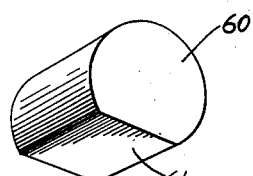
Fig. 4 is a perspective view of a flattened cylindrical block used, as in Fig. 3, to aid in bending portions of the spindle bar or other work piece.

If it is desired to bend the endward extension 23 of the spindle bar transversely opposite to the lateral exposure of the partial counterbore 24, the spindle bar is clamped in the fixture 10 with the partial counterbore 24 facing downwardly. To facilitate the bending of this portion of the spindle bar, a cylindrical block 60 having a chordal flat 61, as illustrated in Figs. 3 and 4, is provided which has a radius slightly less than the radius of the partial counterbore 24. In use the cylindrical portion of the block is placed in the partial counterbore 24 with the flat 61 downwardly disposed. The movable head 56 of the hydraulic jack 55 is brought upwardly against the flat 61 of the block and by forcing the block upwardly the endward extension 23 of the spindle bar is bent correspondingly.

Whenever the cam arm 12 of the spindle bar is bent radially outwardly moving the cam follower journal 26 outwardly to a deformed position, the cam arm and cam follower journal may be moved inwardly by clamping the spindle bar in the fixture with the cam follower journal directly below or downwardly from the axis of the spindle bar, as illustrated in Fig. 7. In order to facilitate the bending of the cam arm a bearing block 64 of rectangular form is provided having a semi-cylindrical recess 65 in one face thereof of a radius substantially that or slightly greater than the radius of the cam follower journal 26. In use, the semi-cylindrical recess 65 of the bearing block receives the lower periphery of the cam follower bearing and the movable head 56 of the hydraulic jack 55 brought upwardly against the opposite face of the bearing block. On operation of the hydraulic jack, the bearing block 64 is forced upwardly bending the cam follower journal inwardly toward the axis of the spindle bar to a desired corrected position.

In nearly all instances of distortion of the spindle bar, the cam follower journal 26 is displaced from its intended position. In order to determine whether or not the spindle bar has been distorted or properly corrected, a testing gauge 70 is provided to check the location of the cam follower journal 26 relative to the axis of the spindle bar and a spindle mounting opening 17. The testing gauge is constructed with an elongated cylindrical rod 71 having a cylindrical enlarged portion 72 at one end thereof. The diameter of the rod 71 is such that it has a slip fit with the bore 16 of the spindle bar. The enlarged cylindrical portion 72 has a diameter appropriate to a sliding fit in the counterbore 22 of the spindle bar. A radial bar 73 of generally rectangular form has an opening 74 therethrough whereby the radial bar is securely attached to the enlarged cylindrical portion 72 of the gauge by means of a press fit between the enlarged portion 72 and the opening 74 or other suitable arrangement. A cylindrical opening 75 is formed radially outwardly and axially parallel of the opening 74 having a diameter fitted to the cam follower journal 26 and in the precise attitude and position relative to the cylindrical portion 72 as the cam follower journal 26 bears to the bore 16 when in operable condition.

Spindle bars 11 for mechanical cotton pickers are made in right and left hand form. The illustrated spindle bar 11 is a left hand spindle bar. The right hand spindle bars have the cam follower journal 26 located diametrically oppositely of their axes from the arrangement in the bar shown. In order to check the proper radial location of the cam follower journals 26 relative to the spindle mounting opening 17 on both types, a pair of cylindrical bores 78 are formed inwardly from diametrically opposite sides of the rod 71 adjacent to the end opposite to the enlarged end portion 72. The bores are inclined endwardly of the rod from true radial position to correspond with the described axial inclination of the spindle mounting openings 17. A plug 79 is provided with screw threads 80 threadably receivable in the screw threads of the spindle mounting openings 17. The plug is also provided with a precision cylindrical surface 81 which has a sliding fit with the cylindrical surface 19 of one of the spindle mounting openings to facilitate locating the plug precisely in spindle position. The plug 79 has a co-axial endwardly extended pin 82 which is adapted to extend into one of the cylindrical bores 78 in the rod 71 to locate the cylindrical opening 75 in the radial bar 73 relative to the aligned spindle mounting opening 17 to check the proper location of the cam follower journal 26 relative to the spindle mounting openings. The pin 82 extends into one of the cylindrical bores 78 to check the location of a left hand cam follower journal 26 and extends into the diametrically opposite cylindrical bore 78 to check a right hand cam follower journal 26.

*Operation*

The operation and utility of the present invention are believed to be apparent and are briefly summarized at this point. In the use of the fixture, rigidly to support a spindle bar for bending portions thereof to corrected positions, the journal portion 20 of the spindle bar is clamped in the semi-cylindrical recesses 34 and 36. This clamping action is accomplished by tightening the nuts 44 downwardly against the clamping washers 42 which forces the clamping block 35 forcibly toward the support block 33. The spindle bar may be clamped in the fixture with the cam arm extended in the most advantageous radial direction for bending the distorted portions of the spindle bar to their desired positions relative to the axis of the spindle bar and the spindle mounting openings 17. The hydraulic jack 55 is positioned to impose force on the cam follower journal 26, cam arm 12, or spindle bar 11, as most conducive to corrective effect.

The location of the cam follower bearing relative to the axis of the spindle bar and to the spindle mounting opening 17 may be checked by means of the testing gauge 70 which may be telescoped internally of the bore 16 and the cylindrical opening 75 on the radial bar 73 slipped over the cam follower journal 26. If the cam follower journal is not in its proper radial distance from the axis of the spindle bar or not parallel thereto, the cylindrical opening will not receive the cam follower journal.

The positioning of the radial bar 73 over the cam follower journal 26 while the gauge 70 is inserted as described, checks only the radial distance of the cam follower journal from the axis of the spindle bar and its parallel relation thereto but does not check the relative disposition of the cam follower journal and the spindle mounting openings 17. In order to test for the proper relation between the journal and the openings, the testing gauge is telescoped inwardly of the spindle bar with the cylindrical opening 75 receiving the cam follower journal 26 as before. If the cam follower journal is in its proper angularity relative to the spindle mounting openings 17, the pin 82 of the plug 79 will enter one of the cylindrical recesses 78 when the plug 79 is screw-threaded in the juxtaposed spindle mounting opening. Whenever the pin 82 of the plug 79 seats in one of the cylindrical recesses 78, the cam follower journal 26 is in its proper intended position and attitude radially outwardly of the axis of the spindle bar and in proper radial angularity relative to the spindle mounting opening. If such seating is precluded by misalignment of the cylindrical recess and the spindle mounting opening, the desired corrective measures are readily determined by visual inspection and appropriate warping or torsional forces applied to the spindle bar by judicious positioning of the spindle bar in the described fixture and application of driving force of the jack to the spindle bar, cam arm, or cam follower journal.

Figure 2:
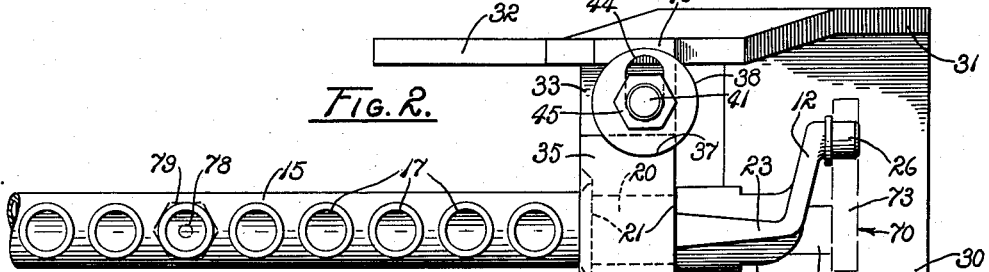
Fig. 2 is a plan view of the fixture and fragmentarily represented spindle bar, illustrated in Fig. 1.

Having described the employment of the fixture of the present invention and the testing gauge 70, brief reference to their combined employment will serve to illustrate the utility of the combination. It is well known that spindle bars of the type described are frequently subjected to torisonal maladjustment in which event although the cam follower journal 26 may be spaced the proper distance from the axis of the bore 16 and may be precisely parallel to the axis of said bore, the relative radial angularity previously described of the spindle mounting openings 17 and the cam follower journal 26 from the axis of the bore 16 precludes successful spindle bar operation. Under such conditions, the pin 82 of the plug 79 will not be admitted by the intended cylindrical recesses 78. With the cam arm 12 substantially horizontally extended, as shown in Fig. 2, and with the gauge 70 in operable position, as shown in dashed line in Fig 2, it is possible by the combined use of the fixture and the gauge accurately to effect the desired torsional corrections. The jack 55 is placed under the radially extended end of the radial bar 73 and manipulated to raise that end and the cam follower journal 26 nested therein. As the jack is raised the cylindrical bore 78 is observable through the spindle mounting opening 17 and torsional stress may be applied to the radial bar and thus to the cam arm 12 accurately to correct for torsional maladjustment. During upward movement of the extended end of the radial bar 73 and the cam follower journal 26, the rotational fit of the rod 71 in the bore 16 and the nesting of the cam follower journal in the cylindrical opening 75 constrains the cam follower journal to proper radial spacing and parallel relation to the axis of the bore 16.

Obviously, if an opposite torsional effect is to be applied in the combined use of the fixture 10 and testing gauge 70, the cam follower journal 26 and the radial bar 73 are horizontally extended in the direction opposite to that shown in Fig. 2 and the jack employed as previously described.

Further, not infrequently the endward extension 23 of the spindle bar 11 is broken therefrom and must be weldably secured in precise position. This is readily achieved by the combined use of the fixture and testing gauge in a manner similar to the previously described torsional correction. The spindle bar is clamped in the fixture, the testing gauge inserted in the bore 16 and locked in rotational position in the bore by application of the plug 79 with the cam follower journal 26 nested in the cylindrical opening 75. Such association constrains the endward extension to the precise position on the spindle bar desired. While so retained, the extension and spindle bar are tacked or spot welded for temporary interconnection and subsequently removed from the fixture for more dependable welding thereof. Subsequent to welding it is desirable to recheck the repaired structure by use of the testing gauge.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and structures.

Having described my invention, what I claim as new and desire to secure by Letters Patent is:

1. An apparatus for correcting torsional distortion of spindle bars of cotton pickers having elongated body portions provided with longitudinal bores and radially disposed spindle mounting openings therein, radially extended cam arms, and cam follower journals extended from the cam arms in parallel relation to the longitudinal bores of the body portions comprising a clamping fixture for holding the body portions of spindle bars in predetermined position, a gauge member having a cylindrical portion extendible into the bores of such spindle bars and having a laterally disposed bore positionable in alignment with the spindle mounting openings and a laterally extended radius bar engageable with the journals thereof, a plug releasably fitted into the spindle openings of such spindle bars having an axially extended pin receivable by the bores of the gauge member, and means for imparting forced rotational positioning to the gauge member relative to the clamping fixture.

2. An apparatus for establishing predetermined relation between a hollow cylindrical body of a work piece having a longitudinal bore and a radially disposed opening, and a bearing journal mounted eccentrically on the body in parallel relation thereto, comprising a clamping fixture having a base, and a clamping block adapted to mount the workpiece in fixed spaced relation to the base; a gauge having a rod slidably fitted to the bore bearing a rotatable positioning indicator visible through the radially disposed opening of the work piece, and a bar radially extended from the rod in fixed relation thereto having an opening therein adapted slidably to receive the journal; and telescopically extensible means positioned between the base and the radially extended bar.

3. An apparatus for correcting torsional distortion of spindle bars of cotton pickers having elongated body portions provided with longitudinal bores and radially disposed spindle mounting openings therein, radially extended cam arms, and cam follower journals extended from the cam arms in parallel relation to the longitudinal bores of the body portions comprising a base plate, a support member upwardly extended from the base plate, means for clamping the body portion of such a spindle bar in spaced relation to the base plate, a rod adapted for slidable receipt into the bores of the body portions of such spindle bars and bearing an orienting demarcation visible through a spindle mounting opening when so received for relative rotatable positioning, a bar rigidly radially extended from the rod having an opening therein in parallel relation to the rod adapted to receive the journal of such a spindle bar, and telescopically extensible means mounted on the base and engageable with the radially extended bar.

4. An apparatus for correcting deformed cotton picker spindle bars each having an elongated body provided with a longitudinal bore and laterally disposed spindle mounting openings in communication with the bore arranged in alignment longitudinally of the body, the body having a journal portion adjacent to an end thereof, a cam arm radially extended from the body adjacent to the journal portion, and a cam follower journal axially extended from the body eccentrically thereof, comprising a base plate; a pair of support members upwardly extended from the base plate; a support block having an upwardly disposed semi-cylindrical recess formed therein mounted between the support members in spaced relation to the base plate; a clamping block having a downwardly disposed semi-cylindrical recess therein positioned above the support plate with the recesses of the plates in juxtaposition; screw-threaded means for drawing the plates together whereby the journal portion of a cotton picker spindle bar is clamped therebetween; a rod having a laterally disposed bore therein adjacent to one end adapted for receipt in the bore of a spindle bar; a plug screw-threadably receivable by a spindle mounting opening of a spindle bar having an axially extended pin receivable by the bore in the rod; a radius bar radially rigidly extended from the end of the rod opposite to the screw-threaded bore engageable with the cam follower journal of a spindle bar; and a jack rested on the base plate engageable with the radius bar for imparting forced rotational movement to the rod.

5. A clamping fixture comprising a base plate, a pair of support members upwardly extended from the base plate having upper ends in substantially equally spaced relation to the base plate, a support block mounted between the support members intermediate the base plate and the upper ends of said members in parallel relation to the base having an upwardly disposed semi-cylindrical recess formed therein, a pair of screw-threaded studs upwardly extended from the support block in substantially parallel relation on opposite sides of the recess in the support block, a clamping block received between the studs and having a downwardly disposed semi-cylindrical recess therein in juxtaposition to the semi-cylindrical recess of the support block, the clamping block having opposite ends providing segmentally cylindrical notches concentric to the studs, substantially cylindrical washers fitted to the notches of the clamping block and rested in said notches and on the upwardly extended ends of the support members in circumscribing relation to the studs, and nuts screw-threadably mounted on the studs in engagement with the washers.

6. A clamping fixture comprising a base plate, a pair of spaced support members upwardly extended from the base plate having upper ends providing flat upwardly disposed surfaces in a common plane in substantially parallel spaced relation to the base plate, a support block mounted between the support members intermediate the base plate and the upper ends of said members in substantially parallel spaced relation to the base plate having an upwardly disposed semi-cylindrical recess formed transversely therein, a pair of screw-threaded studs mounted on the base plate and upwardly extended therefrom in substantially parallel relation individually inwardly adjacent to the upwardly extended ends of the support members, a clamping block received between the studs in overlaying relation to the support block and having a downwardly disposed semi-cylindrical recess therein in juxtaposition to the semi-cylindrical recess of the support block, the clamping block having upwardly disposed segmentally cylindrical notches in opposite ends thereof concentric to the studs and providing clamping surfaces substantially aligned with the upwardly disposed surfaces of the ends of the support members, substantially cylindrical washers fitted to the notches in the clamping block and rested on the clamping surfaces of the clamping block and the respectively adjacent upwardly disposed end surfaces of the support members, the washers having diametrically elongated openings therein receiving the studs for diametric movement of the washers relative to their respective studs and rotational adjustment relative thereto, and nuts screw-threadably mounted on the upwardly extended ends of the studs for tightened engagement downwardly against the washers.

7. A clamping fixture comprising a base plate, a pair of spaced support members upwardly extended from the base plate having upper ends providing flat upwardly disposed surfaces in a common plane in substantially parallel spaced relation to the base plate, a support block mounted between the support members intermediate the base plate and the upper ends of said members in substantially parallel spaced relation to the base plate having an upwardly disposed semi-cylindrical recess formed transversely therein, a pair of screw-threaded studs mounted on the base plate and upwardly extended therefrom in substantially parallel relation individually inwardly adjacent to the upwardly extended ends of the support members, a collar rigidly mounted in circumscribing relation on each stud each providing an upwardly disposed surface in circumscribing relation to each stud downwardly adjacent to the plane of the upwardly disposed end surfaces of the support members, a clamping block received between the studs in overlaying relation to the support block and having a downwardly disposed semi-cylindrical recess therein in juxtaposition to the semi-cylindrical recess of the support block, the clamping block having upwardly disposed segmentally cylindrical notches in opposite ends thereof concentric to the studs and providing clamping surfaces substantially aligned with the upwardly disposed surfaces of the ends of the support members, substantially cylindrical washers fitted to the notches in the clamping block and rested on the clamping surfaces of the clamping block and the respectively adjacent upwardly disposed end surfaces of the support members, the washers having diametrically elongated openings therein receiving the studs for diametric movement of the washers relative to their respective studs and rotational adjustment relative thereto, and nuts screw-threadably mounted on the upwardly extended ends of the studs for tightened engagement downwardly against the washers.

CARL R. WORTHINGTON.

References Cited in the file of this patent

UNITED STATES PATENTS

| Number | Name | Date |
|---|---|---|
| 2,365,731 | Simons | Dec. 26, 1944 |
| 2,386,011 | Stanley | Oct. 2, 1945 |
| 2,431,291 | Wochner | Nov. 18, 1947 |